(12) United States Patent
Traidl

(10) Patent No.: US 12,516,704 B2
(45) Date of Patent: *Jan. 6, 2026

(54) METHOD FOR CHECKING THE ACTUATING ACCURACY OF A CLUTCH WHEN AN ELECTRIC OR HYBRID MOTOR VEHICLE IS AT A STANDSTILL

(71) Applicant: MAGNA Powertrain GmbH & Co KG, Lannach (AT)

(72) Inventor: Thomas Traidl, Linz (AT)

(73) Assignee: MAGNA Powertrain GmbH & Co KG, Lannach (AT)

(*) Notice: Subject to any disclaimer, the term of this patent is extended or adjusted under 35 U.S.C. 154(b) by 0 days.

This patent is subject to a terminal disclaimer.

(21) Appl. No.: 18/958,088

(22) Filed: Nov. 25, 2024

(65) Prior Publication Data

US 2025/0084903 A1 Mar. 13, 2025

Related U.S. Application Data

(63) Continuation of application No. 17/925,062, filed as application No. PCT/EP2021/060300 on Apr. 21, 2021, now Pat. No. 12,181,006.

(30) Foreign Application Priority Data

May 20, 2020 (DE) .......................... 10 2020 206 390

(51) Int. Cl.
*F16D 48/06* (2006.01)

(52) U.S. Cl.
CPC .... *F16D 48/06* (2013.01); *F16D 2500/10406* (2013.01); *F16D 2500/30406* (2013.01); *F16D 2500/30412* (2013.01)

(58) Field of Classification Search
CPC .... B60W 10/08; B60W 10/18; B60W 10/182; B60W 10/184; B60W 10/02;
(Continued)

(56) References Cited

U.S. PATENT DOCUMENTS 9,377,062 B2 6/2016 Lee et al.
12,181,006 B2 * 12/2024 Traidl .................. B60W 10/02
(Continued)

FOREIGN PATENT DOCUMENTS

DE 10228709 A1 2/2003
DE 102017009297 A1 4/2018
EP 1760349 A2 3/2007

*Primary Examiner* — Lori Wu
(74) *Attorney, Agent, or Firm* — Dickinson Wright PLLC

(57) ABSTRACT

Methods are provided for checking the actuating accuracy of a clutch arranged in a force flow between a fixable shaft and an electric machine of an electric or hybrid motor vehicle when at a standstill. One method includes: fixing the shaft, setting a defined setpoint torque on the clutch to be checked, continuously ramping up the electric machine up until the first slipping of the clutch, comparing the achieved torque of the electric machine with the setpoint torque preset on the clutch. Another method includes: fixing the shaft, ramping up the electric machine to a defined rotational speed, setting a defined setpoint torque on the clutch to be checked, comparing the torque of the electric machine needed to maintain a constant rotational speed with the setpoint torque set on the clutch.

20 Claims, 3 Drawing Sheets

(58) Field of Classification Search
CPC ... B60W 2510/0275; B60W 2510/083; B60W 2710/021; B60W 2710/025; B60W 2710/027; F16D 48/06; F16D 2500/10406; F16D 2500/30406; F16D 2500/30412; F16D 2500/1045; F16D 2500/1066; F16D 2500/1107; F16D 2500/3065; F16D 2500/50236; F16D 2500/50245; F16D 2500/50254; F16D 2500/50281; F16D 2500/7044; F16D 2500/70454; F16D 2500/50263
See application file for complete search history.

(56) References Cited

U.S. PATENT DOCUMENTS

| | | | |
|---|---|---|---|
| 2008/0091324 A1 | 4/2008 | Werner | |
| 2010/0108420 A1* | 5/2010 | Keiji | B60W 10/02 701/67 |
| 2013/0066530 A1 | 3/2013 | Holzer et al. | |
| 2013/0304337 A1* | 11/2013 | Terakawa | B60W 10/06 701/58 |
| 2019/0338850 A1 | 11/2019 | Moorman | |
| 2021/0394742 A1 | 12/2021 | Mannsperger | |
| 2023/0023400 A1 | 1/2023 | Blanckenfiell | |

\* cited by examiner

METHOD FOR CHECKING THE ACTUATING ACCURACY OF A CLUTCH WHEN AN ELECTRIC OR HYBRID MOTOR VEHICLE IS AT A STANDSTILL

CROSS-REFERENCE TO RELATED APPLICATIONS

This application is a Continuation Applications of U.S. patent application Ser. No. 17/925,062, filed Nov. 14, 2022, which is a National Stage of International Application No. PCT/EP2021/060300, filed Apr. 21, 2021, which claims priority to DE 10 2020 206 390.7, filed May 20, 2020. The entire disclosures of each of the above applications are incorporated herein by reference.

FIELD

The present disclosure relates to a method for checking the positioning accuracy of a clutch when an electric or hybrid motor vehicle is at a standstill, wherein the electric or hybrid motor vehicle has at least one electric machine and wherein the clutch to be checked is arranged in a force flow between the electric machine and a shaft which can be held stationary.

BACKGROUND

Clutches of all types constitute important components in automotive engineering. To ensure proper functioning thereof and, more precisely, a high torque accuracy and therefore a high driving comfort, it is necessary, where possible, to know the exact parameters of a clutch over its life cycle. In modern automotive engineering, multi-plate clutches (friction clutches) are often used. In this regard, a multi-plate clutch in a motor vehicle may serve to transmit torques between a drive unit and a gear of the motor vehicle. Furthermore, multi-plate clutches may be used, for example, to realize "torque vectoring" units on at least one axle of a motor vehicle. Multi-plate clutches, or clutches in general, are often electromechanically actuated, wherein the torque which may be transmitted by the clutch is calculated from an actuator position. If, over the service life of the clutch, effects occur which have not been taken into account in this torque calculation, for example a change in the friction coefficient caused by water or contaminants penetrating into a lubricant of a wet-running clutch, wear, temperature influences etc., this may result in significant deviations between a desired torque that should be transmitted by the clutch (setpoint torque), and an actual torque that is transmitted by the clutch (actual torque). This may result in deviations outside the requirements of the clutch or even to safety-critical situations.

SUMMARY

This section provides a general summary of the disclosure, and is not a comprehensive disclosure of its full scope or all of its features.

An object of the invention is to present an improved method for checking the positioning accuracy of a clutch when an electric or hybrid motor vehicle is at a standstill.

This requirement may be met by a method for checking the positioning accuracy of a clutch when an electric or hybrid motor vehicle is at a standstill, wherein the electric or hybrid motor vehicle has at least one electric machine and wherein the clutch to be checked is arranged in a force flow between the electric machine and a shaft which can be held stationary, comprising at least the followings steps: holding the shaft stationary, setting a defined setpoint torque at the clutch to be checked, steadily accelerating the electric machine up to the first slip of the clutch, comparing the torque reached by the electric machine with the setpoint torque preset at the clutch, or at least the following steps: holding the shaft stationary, accelerating the electric machine to a defined speed, setting a defined setpoint torque at the clutch to be checked, comparing the torque of the electric machine which is needed to maintain a constant speed with the setpoint torque set at the clutch. Advantageous embodiments of the present disclosure are described in the dependent claims.

The method of the present disclosure for checking the positioning accuracy of a clutch is used in an electric or hybrid motor vehicle and is implemented when the motor vehicle is at a standstill. An electric or hybrid motor vehicle in which the method of the present disclosure may be applied has at least one electric machine. In this case, the clutch to be checked is arranged in a force flow between this electric machine and a shaft which can be held stationary, i.e. locked.

In this context, a clutch is understood to be a single clutch, for example a multi-plate clutch.

In this context, an electric or hybrid motor vehicle which is at a standstill is understood to be an electric or hybrid motor vehicle which is stationary and not moving.

The method of the present disclosure may be implemented "statically" or "dynamically".

The "static" variant of the method of the present disclosure includes at least the following steps:
holding the shaft stationary,
setting a defined setpoint torque at the clutch to be checked,
steadily accelerating the electric machine up to the first slip of the clutch,
comparing the torque reached by the electric machine with the setpoint torque preset at the clutch.

The "dynamic" variant of the method of the present disclosure comprises at least the following steps:
holding the shaft stationary,
accelerating the electric machine to a defined speed,
setting a defined setpoint torque at the clutch to be checked,
comparing the torque of the electric machine which is needed to maintain a constant speed with the setpoint torque set at the clutch.

The method is preferably applied to a clutch which is part of a clutch system having at least two clutches, wherein each clutch of the clutch system is checked in terms of its positioning accuracy by way of the method of the present disclosure, and wherein, during the checking of one clutch of the clutch system, the at least one other clutch is fully disengaged.

Disengagement of a clutch is understood to mean that the clutch is fully disconnected.

By way of the method of the present disclosure, using the exact torque and speed information at the electric machine, the positioning accuracy of the clutch may be checked by presetting a defined clutch setpoint torque via the actuation of the clutch and comparing this torque with the torque of the electric machine (taking into account transmission ratios and efficiency levels). Deviations in the positioning accuracy may thus be identified and suitable correction measures may be implemented at the software end (motor control). Furthermore, changes in the friction coefficient may be ascertained, whereby water penetration into the lubricant (oil) of a wet-running clutch may even be detected, because this results in a specific change in the friction coefficient curve.

By way of the method of the present disclosure, it is therefore possible to check clutches with electric drives in terms of positioning accuracy without additional expenditure on components. By way of the method of the present disclosure, the accuracy of a clutch may be increased and errors, in particular water penetration into a lubricant, such as oil, in the case of wet-running clutches, may be identified. The safety of a motor vehicle may thus be increased, complaints reduced, and, due to the high positioning accuracy of the clutch, the performance of the motor improved.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

The invention is described by way of example below, with reference to the drawings.

DETAILED DESCRIPTION

Figure 1:
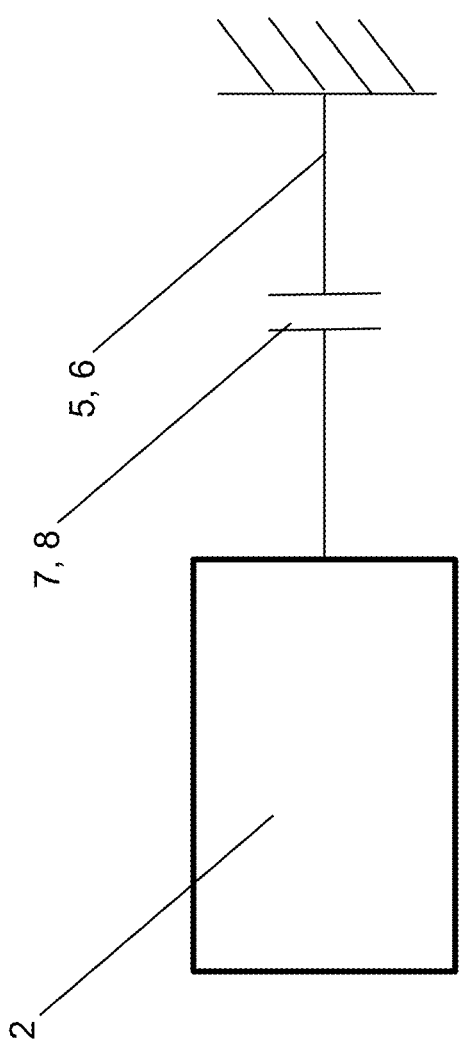
FIG. 1 shows a schematic illustration of a setup for applying a method of the present disclosure.

The method of the present disclosure for checking the positioning accuracy of a clutch 7, 8 is used in in an electric or hybrid motor vehicle and is implemented when the motor vehicle is at a standstill. An electric or hybrid motor vehicle in which the method may be applied has at least one electric machine 2, a clutch 7, 8, and a shaft 5, 6 which can be held stationary (FIG. 1).

Figure 2:
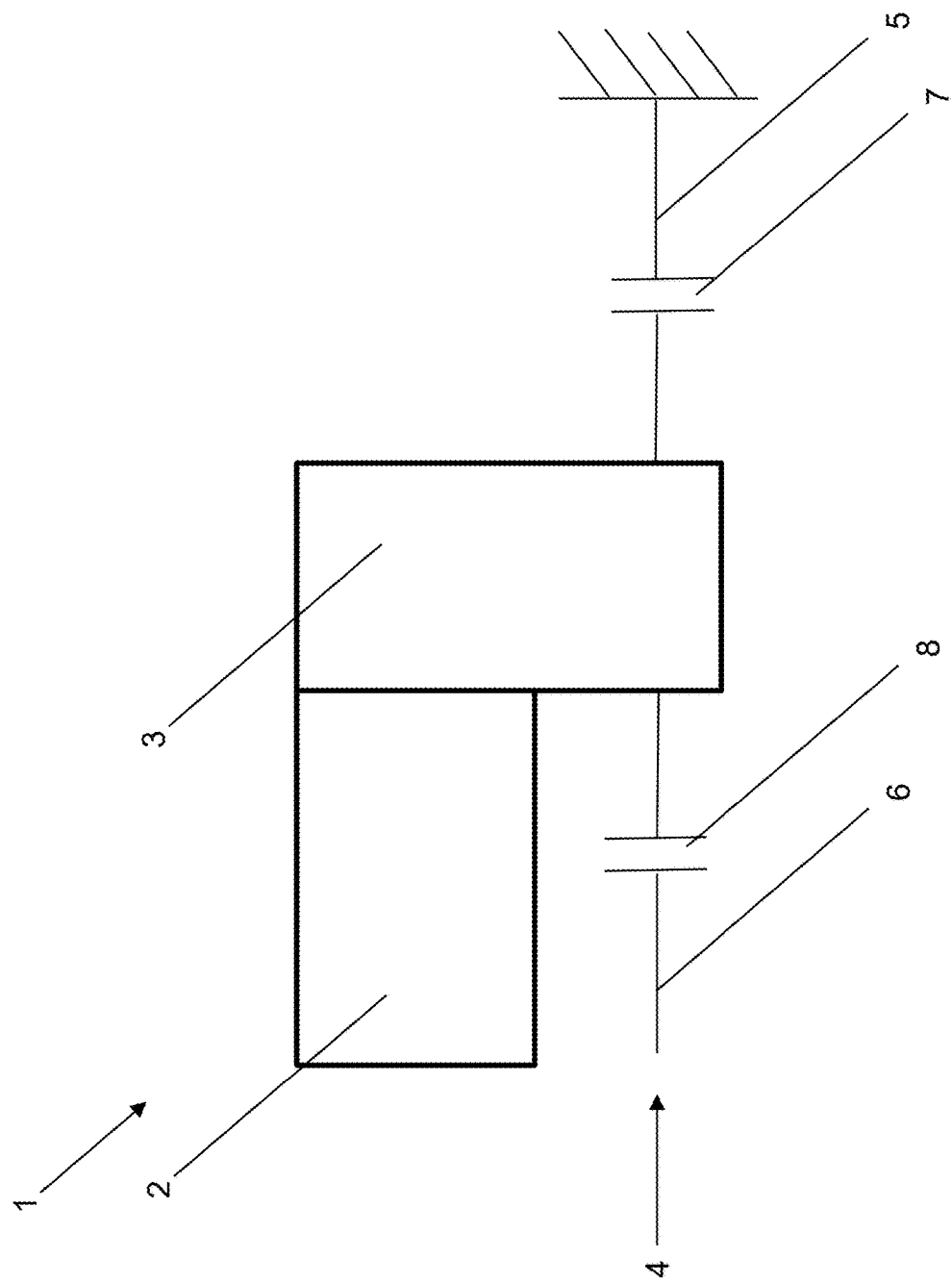
FIG. 2 shows a schematic illustration of an electric motor vehicle axle with a "torque vectoring" unit.

A "torque vectoring" system 1 is illustrated schematically in FIG. 2. The functionality of the method of the present disclosure is explained below, with reference to the "torque vectoring" system 1 illustrated in FIG. 2 by way of example. However, the method may essentially be used in all systems in which a clutch 7, 8 may be driven against a locked shaft 5, 6 by an electric machine 2 (FIG. 1).

The prerequisite for implementing the method of the present disclosure is therefore a drive architecture in which a clutch to be checked 7, 8 may be driven against a locked shaft 5, 6 by an electric machine 2 serving as a drive unit.

The "torque vectoring" system 1 illustrated in FIG. 2 comprises an electric machine 2, which is drivingly connected to a motor vehicle axle 4 of an electric or hybrid motor vehicle via a reduction gear 3. The motor vehicle axle 4 may be, for example, a front or rear axle of a motor vehicle and has two side shafts 5, 6, namely a first side shaft 5 and a second side shaft 6, which are each connected to at least one wheel of the motor vehicle.

A clutch 7, 8 is arranged in each case between the reduction gear 3 and a respective side shaft 5, 6, namely a first clutch 7 is arranged between the reduction gear 3 and the first side shaft 5 and a second clutch 8 is arranged between the reduction gear 3 and the second side shaft 6. Both clutches 7, 8 are designed as multi-plate clutches. Both the first side shaft 5 and the second side shaft 6 may be locked independently of one another via a service brake of the motor vehicle. The first side shaft 5 and the second side shaft 6 are therefore designed to be locked. The locking is generally realized automatically, i.e. without intervention by the driver of the motor vehicle. (FIG. 2).

Figure 3:
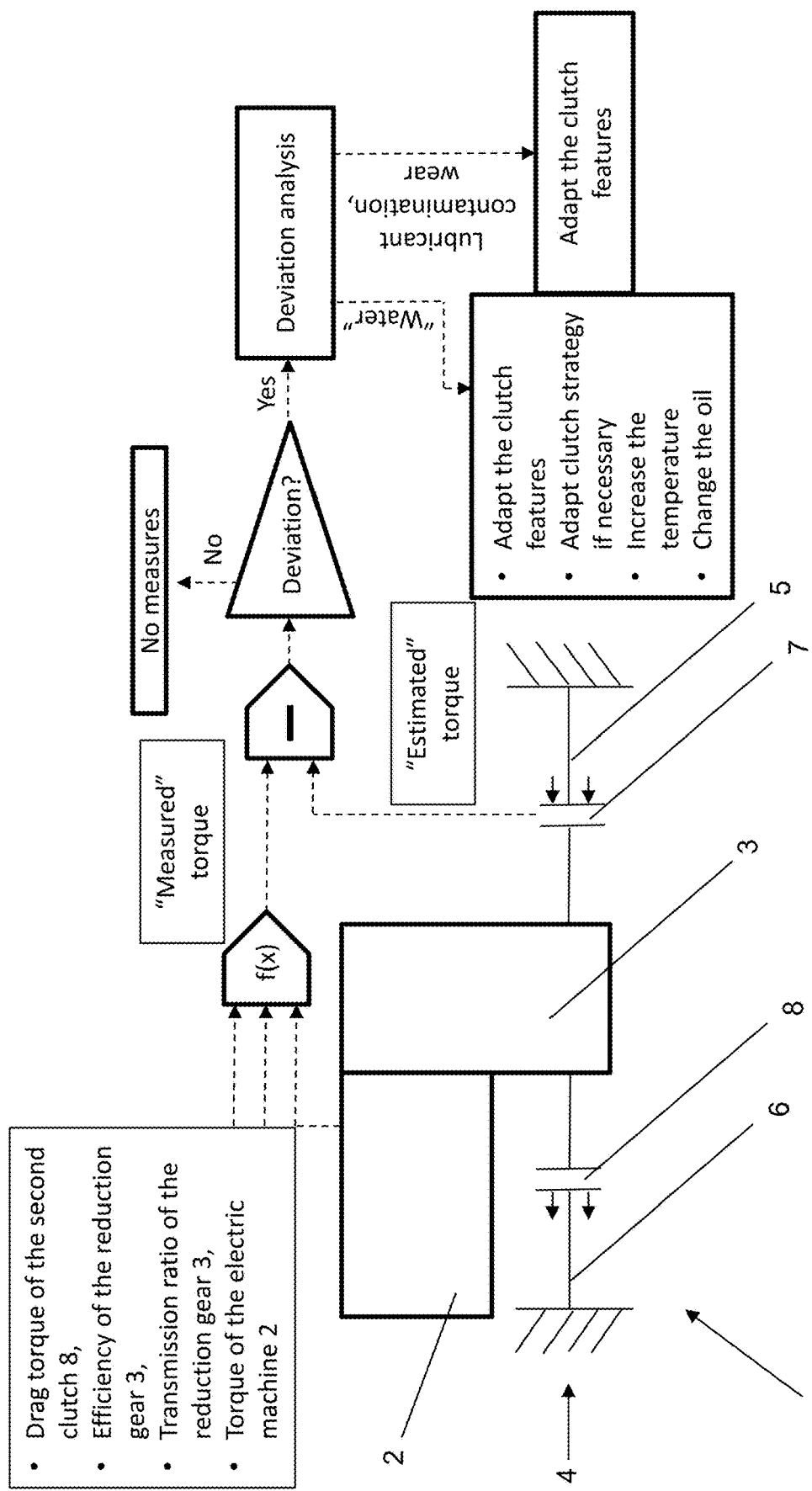
FIG. 3 shows a schematic sequence of a method of the present disclosure based on the example of an electric motor vehicle axle with a "torque vectoring" unit according to FIG. 2.

For further explanation of the method, only the checking of one of the two clutches 7, 8, namely the first clutch 7, of the "torque vectoring" system 1 is described (FIG. 3). The clutch to be checked is therefore the first clutch 7. Checking of the second clutch 8 takes place through analogous application of the method in a manner adapted to the second clutch 8.

The method for checking the positioning accuracy of the first clutch 7 and/or the second clutch 8 may be implemented in two different variants, namely in a first variant ("static" variant) and a second variant ("dynamic variant").

In the "static" first variant of the method, the service brake of the first side shaft 5 is activated automatically in the stationary state and thus locks this first side shaft. At the same time, the second clutch 8 (the clutch which is not to be checked) is fully disengaged. The first clutch 7 (the clutch to be checked) is then set to a defined setpoint torque. To determine the torque of the electric machine 2 up to a first slip of the first clutch 7, the torque of the electric machine 2 is then steadily increased. This determined torque is compared with the setpoint torque of the first clutch 7, taking into account the gear ratio of the reduction gear 3 and losses. A deviation may thus be identified (FIG. 2, FIG. 3).

In the "dynamic" second variant of the method, the service brake of the first side shaft 5 is activated automatically in the stationary state and thus locks this first side shaft. At the same time, the second clutch 8 (the clutch which is not to be checked) is fully disengaged. The electric machine 2 is then regulated to a defined speed, which determines a differential speed of the first clutch 7. The first clutch 7 is then actuated to a defined setpoint torque. The torque which is to be applied during this by the electric machine 2 in order to keep the defined speed constant is compared with the defined setpoint torque of the first clutch 7, taking into account the gear ratio of the reduction gear 3 and losses. A deviation may be determined from this comparison. The clutch behavior may also be determined via the speed difference by way of the second variant of the method (FIG. 2, FIG. 3).

From the deviations at various operating points of the first clutch 7, which are determined by way of the first variant and/or the second variant of the method, it is possible to evaluate the cause of the error in the positioning accuracy of the first clutch 7 (e.g. wear, contamination of the lubricant caused by abrasion or water penetration). The comparison of the torques is implemented at the software end via the motor control of the electric machine 2. The software reacts accordingly to the result of the comparison and adapts clutch parameters of the first clutch 7 to the "new" situation, for example, and/or also outputs error notifications (FIG. 2, FIG. 3). However, the comparison may also be implemented at the software end via another control unit installed in the motor vehicle, for example an inverter control unit, an actuator control unit, etc.

The setting of the setpoint torque at the first clutch 7 takes place via an actuator unit of the first clutch 7. The actuator unit may be of electric, electromechanical, pneumatic or hydraulic design, for example.

In particular, in the case of wet-running clutches 7, 8, the identification of water penetration into a lubricant, such as oil in this case, should be noted. Water in oil results in a significant and specific change in the friction coefficient and the friction coefficient curve of the clutch 7, 8 over the differential speed. If the behavior of the clutch 7, 8 (to be checked) in the event of water penetration is known, the change in the friction coefficient caused by the water may be identified by way of the method of the present disclosure and the quantity of water in the oil may also be evaluated. If water penetration has been detected, corrective measures may be taken to prevent the risk to a driver of the vehicle or to avoid complaints and reestablish the necessary positioning accuracy of the clutch system. By adapting a stored clutch characteristic of the clutch 7, 8 to the altered friction coefficient, a correction may be made at the software end. A possible corrective measure at the hardware end would be an oil change. A further corrective measure with regard to the system illustrated in FIG. 2 would be to introduce clutch energy specifically into the respective clutch 7, 8 with the service brake engaged in the stationary state. This increases the temperature of the oil and therefore causes the water in the oil to evaporate. Hot, damp air escapes through a vent valve of the motor vehicle and, as the oil is cooled, cold air with a lower water content is taken in again, whereby the water content in the oil is reduced without a stay at the workshop (FIG. 2, FIG. 3).

LIST OF REFERENCE SIGNS

1 "Torque vectoring" system
2 Electric machine
3 Reduction gear
4 Motor vehicle axle
5 First side shaft
6 Second side shaft
7 First clutch
8 Second clutch

What is claimed is:

1. A system for checking positional accuracy of a clutch comprising:
    an electric machine (2);
    a shaft (5,6) operatively coupled to and driven by the electric machine (2);
    a clutch (7,8) arranged in a force flow between the electric machine (2) and the shaft (5,6); and
    a control unit configured to check the positional accuracy of the clutch (7, 8);
    wherein the shaft (5,6) is configured such that it can be controlled to be held stationary;
    wherein, when the shaft (5,6) is held stationary:
        the control unit sets a defined setpoint torque at the clutch (7, 8) to be checked,
        the control unit steadily accelerates the electric machine (2) up to a first slip of the clutch (7, 8),
        the control unit compares a torque reached by the electric machine (2) with the setpoint torque preset at the clutch (7, 8), wherein the control unit determines a torque difference between the torque reached and the setpoint torque; and
        the control unit automatically identifies an altered friction coefficient in the clutch based on the torque difference.
2. The system as claimed in claim 1, wherein the shaft (5, 6) is part of a shaft system having at least two shafts, and wherein the clutch (7, 8) is one of at least two clutches (7, 8), wherein a respective clutch of the at least two clutches (7, 8) is arranged in the force flow between the electric machine (2) and a respective shaft of the at least two shafts (5, 6).
3. The system as claimed in claim 2, wherein each shaft (5, 6) and each clutch (7, 8) is independently controllable, wherein the control unit is configured to check the positional accuracy of each clutch when each shaft is held stationary.
4. The system as claimed in claim 3, wherein, during the checking of one of the respective clutches, the other clutch (7, 8) is fully disengaged.
5. The system as claimed in claim 1, wherein the shaft associated with the clutch to be checked is held stationary and engaged by a service brake, wherein the service brake holds the shaft during the acceleration by the electric machine.
6. The system as claimed in claim 5, wherein the service brake locks the shaft automatically without intervention by the driver.
7. The system as claimed in claim 1, wherein the control unit automatically adapts a stored clutch characteristic to the altered friction coefficient using software executed by the control unit.
8. The system as claimed in claim 1, wherein, when a service brake associated with the clutch to be checked is engaged with the associated shaft, the clutch receives clutch energy and heats oil stored in the clutch causing water to evaporate from the oil, thereby correcting the torque difference.
9. The system as claimed in claim 1, wherein the control unit outputs an error in response to determining the torque difference.
10. A system for checking positional accuracy of a clutch comprising:
    an electric machine (2);
    a shaft (5,6) operatively coupled to and driven by the electric machine (2);
    a clutch (7,8) arranged in a force flow between the electric machine (2) and the shaft (5,6); and
    a control unit configured to check the positional accuracy of the clutch (7, 8);
    wherein the shaft (5,6) is configured such that it can be controlled to be held stationary;
    wherein, when the shaft (5,6) is held stationary:
        the control unit accelerates the electric machine (2) to a defined speed,
        the control unit sets a defined setpoint torque at the clutch (7, 8) to be checked,
        the control unit compares the torque of the electric machine (2) which is needed to maintain a constant speed with the setpoint torque set at the clutch (7, 8),
        wherein the control unit determines a torque difference between the torque reached and the setpoint torque; and
        the control unit automatically identifies an altered friction coefficient in the clutch based on the torque difference.
11. The system of claim 10, wherein the control unit automatically adapts a stored clutch characteristic to the altered friction coefficient using software executed by the control unit.
12. The system as claimed in claim 10, wherein the shaft associated with the clutch to be checked is held stationary and engaged by a service brake, wherein the service brake holds the shaft during the acceleration by the electric machine.

13. The system as claimed in claim 12, wherein the service brake locks the shaft automatically without intervention by the driver.

14. The system as claimed in claim 10, wherein, when a service brake associated with the shaft is engaged in a stationary state, the clutch receives clutch energy and heats oil stored in the clutch causing water to evaporate from the oil, thereby correcting the torque difference.

15. A system for checking positional accuracy of a clutch comprising:

an electric machine (2);

a shaft (5,6) operatively coupled to and driven by the electric machine (2);

a clutch (7,8) arranged in a force flow between the electric machine (2) and the shaft (5,6); and a control unit configured to check the positional accuracy of the clutch (7, 8);

wherein the shaft (5,6) is configured such that it can be controlled to be held stationary;

wherein, when the shaft (5,6) is held stationary:

the control units sets a defined setpoint torque at the clutch (7, 8) to be checked, the control unit accelerates the electric machine (2) to a threshold measurement level, and the control unit compares a needed torque of the electric machine (2) which is needed to satisfy the threshold measurement level with the setpoint torque set at the clutch (7, 8) and the control unit determines a torque difference therebetween; and wherein the control unit identifies an altered friction coefficient based on the torque difference and corrects for the altered friction coefficient.

16. The system as claimed in claim 15, wherein the threshold measurement level is a defined speed.

17. The system as claimed in claim 16, wherein the needed torque is the torque needed to maintain the defined speed.

18. The system as claimed in claim 15, wherein the threshold measurement level is a first slip of the clutch.

19. The system as claimed in claim 18, wherein the needed torque is the torque reached at the first slip of the clutch.

20. The system as claimed in claim 15, wherein the system includes two clutches and two shafts, wherein when the positional accuracy of one of the clutches is being checked, the other of the clutches is disengaged.

* * * * *